United States Patent [19]

McKinney

[11] Patent Number: 5,653,905
[45] Date of Patent: Aug. 5, 1997

[54] ROYALTON NATURAL AIR MOVEMENT SYSTEM

[76] Inventor: Eugene F. McKinney, 3921 Sleepy Hollow Rd., Brunswick, Ohio 44212

[21] Appl. No.: 391,412

[22] Filed: Feb. 16, 1995

[51] Int. Cl.$^6$ .................. F27D 11/00; A21B 1/26
[52] U.S. Cl. .................. 219/400; 219/407; 219/399; 219/409; 219/530
[58] Field of Search .................. 219/406, 407, 219/399, 400, 402, 409, 530, 540; 34/220

[56] References Cited

U.S. PATENT DOCUMENTS

| | | | |
|---|---|---|---|
| 2,494,903 | 1/1950 | Sheidler | 219/399 |
| 2,718,854 | 9/1955 | Michaelis | 107/55 |
| 3,051,582 | 8/1962 | Muckler et al. | 219/386 |
| 3,197,185 | 7/1965 | Beattie | 263/40 |
| 3,265,861 | 8/1966 | Perlman | 219/399 |
| 3,282,578 | 11/1966 | Ulbrich | 263/40 |
| 3,327,041 | 6/1967 | Clune | 13/10 |
| 3,760,155 | 9/1973 | Polanski | 219/399 |
| 3,816,704 | 6/1974 | Borom et al. | 219/530 |
| 4,160,152 | 7/1979 | Wightman et al. | 219/438 |
| 4,209,569 | 6/1980 | Brugger | 428/472 |
| 4,629,866 | 12/1986 | Procter | 219/439 |
| 4,648,377 | 3/1987 | VanCamp | 126/21 |
| 4,677,280 | 6/1987 | Kai | 219/385 |
| 4,978,295 | 12/1990 | Vukovich, Jr. | 432/120 |

FOREIGN PATENT DOCUMENTS

| | | | |
|---|---|---|---|
| 437995 | 11/1935 | United Kingdom | 219/402 |

*Primary Examiner*—Teresa J. Walberg
*Assistant Examiner*—J. Pelham
*Attorney, Agent, or Firm*—Joseph H. Taddeo

[57] ABSTRACT

A holding oven designed for creating a natural convection current in the chamber of the oven, and constructed by fixing the heater element to a first material characterized by its high thermal conductivity for rapid build-up of thermal gradient into an insulated space, while that heater element is simultaneously in contact with a second material which is characterized by its high thermal capacitance for slowing thermal discharge upon repeated opening and closing of oven doors. The first material forms a heat sink and the second material forms a heat bank and the heat sink/bank is adapted to maintain a safe holding temperature over a more extended period of time in a power off mode.

11 Claims, 3 Drawing Sheets

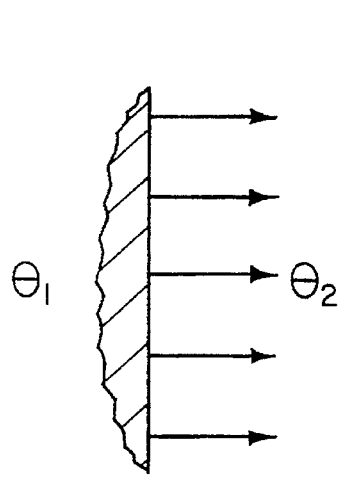
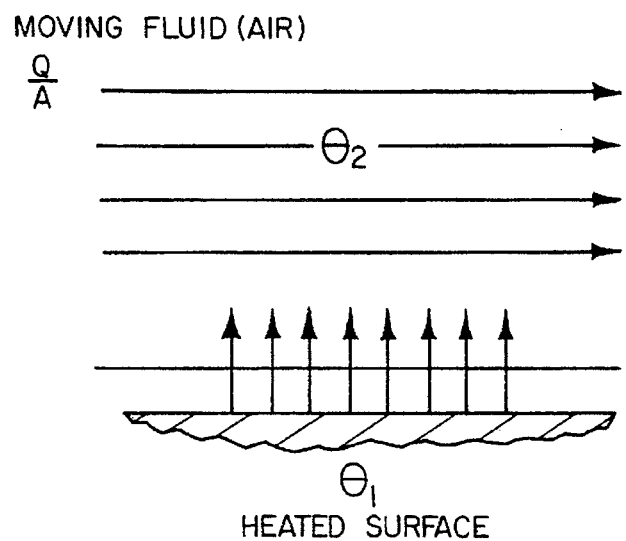
FIG. 1
FIG. 2
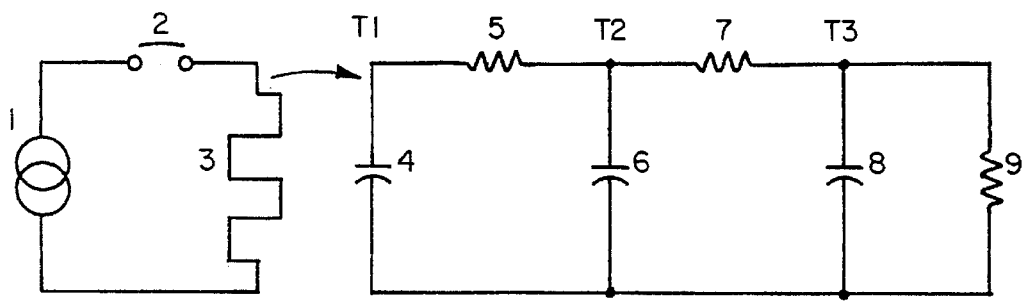
FIG. 3
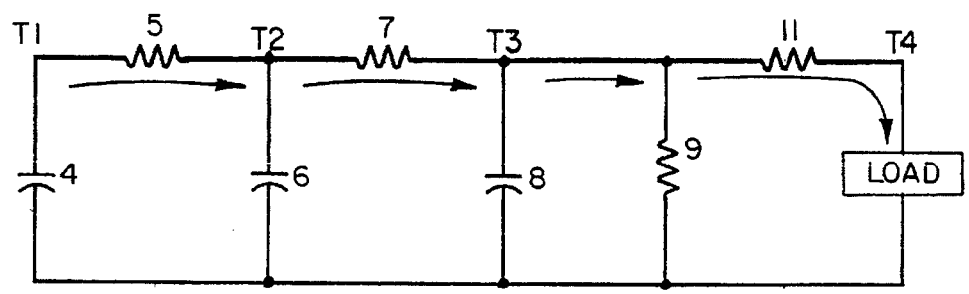
FIG. 4

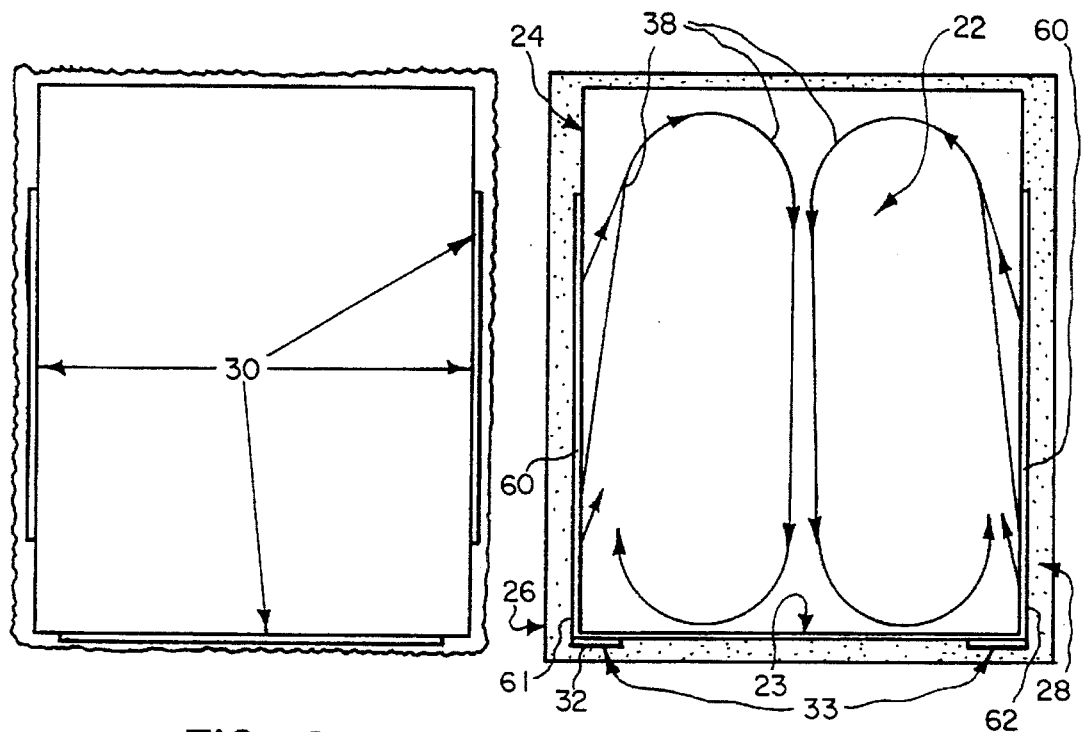
FIG. 6 (PRIOR ART)
FIG. 7
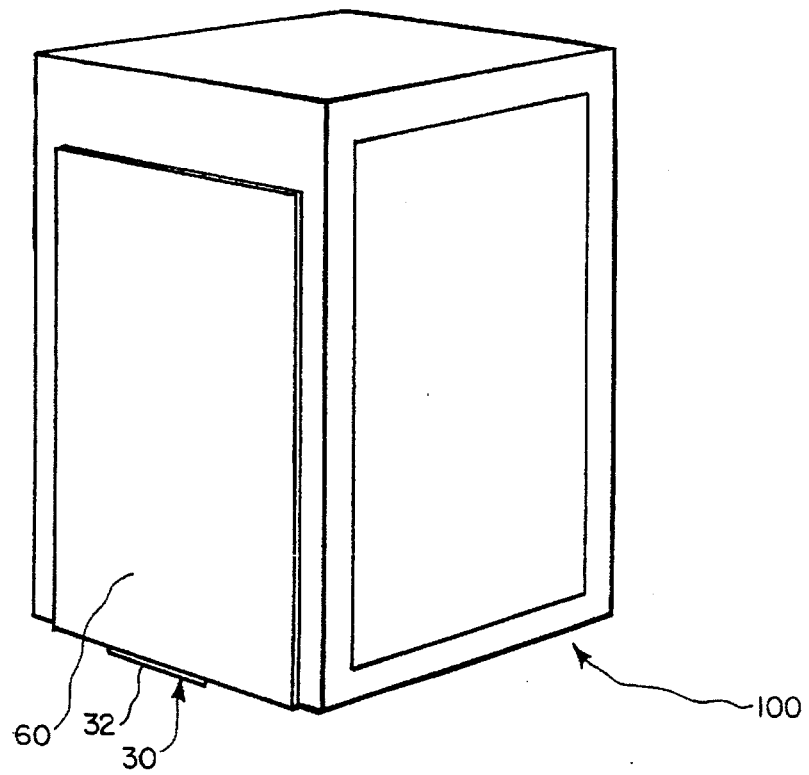
FIG. 8

ROYALTON NATURAL AIR MOVEMENT SYSTEM

FIELD OF THE INVENTION

This invention relates to ovens for heating and keeping foods warm, and more particularly to an improved holding oven that uses natural convection derived from a novel stabilized heat source.

BACKGROUND OF THE INVENTION

Prior oven designs use heaters which are either fastened to the walls or floor, or may even totally encompass the entire interior of the cabinet. All of these systems tend to create stagnant heat near the top of the cooking or heating chamber which just continues to get hotter, resulting in a large thermal gradient within the cabinet.

Positioning of heater elements and controls is generally dictated by whether the cabinet includes single or dual access doors as well as the fact that the heated air within the cabinet rises to the top. It has been found that convection heat flow is preferred for cooking purposes, since convection heat cooks the food more thoroughly and quickly, while radiant heat is used to store and tenderize food. Proofing is the process for adding dough and water during the cooking process to keep the dough from cracking when rising, and requires maintenance of a target temperature and humidity within the cabinet.

These design considerations are complicated by frequent opening and closing of the doors during use. Thus an ideal design would enable natural heat circulation; would reduce temperature variation within the cabinet; would allow ready access to the heaters for enhanced serviceability with reduced maintenance costs; and, would achieve the foregoing at greater efficiency by reduction in wattage used.

Prior art devices are not calculated to attain these goals or, if so designed, have not attained them.

U.S. Pat. No. 2,718,854, to Michaelis, 1951, discloses a bake pan or oven deck to provide a diffuse heat to eliminate burned spots with decreased heat by conduction and increased heat by radiation.

U.S. Pat. No. 3,197,185, to Beattie, 1963, is a heat furnace directed to heat treatment of glass.

U.S. Pat. No. 3,282,578, to Ulbrich, 1966, represents a liner for a furnace or kiln to absorb thermal shock.

U.S. Pat. No. 3,327,041, to Clune, 1964, is a heat shield pack with cylindrical heat shields of spaced-apart heat shield leaves of refractory material.

U.S. Pat. No. 4,209,569, to Brugger, 1980, is an aluminum baking form coated with aluminum oxide and the method of making same.

U.S. Pat. No. 4,648,377, to Van Camp, includes a gas fired blower and an improved, bifurcated heat exchanger.

The firing chamber of U.S. Pat. No. 4,978,295, to Vukovich, Jr., 1990, includes an upper ventilation aperture and an exhaust fan.

Accordingly, there is a need for commercial baking ovens and holding ovens with a chamber which can rapidly achieve a predetermined temperature with improved temperature maintenance capacity through repeated opening and closing of the cabinet in ordinary use and when the oven is in a thermostatically controlled power off mode.

It is therefore a principal object of the invention to provide a holding oven incorporating a heat sink formed of a first material with high thermal capacitance for rapid build-up and slow discharge of heat into an insulated space and, further incorporating a heat sink formed of a material with lower thermal capacity but having a thermal conductivity a multiple of four or greater times that of the first material.

Another object of the invention is to provide for natural heat circulation to diminish temperature variation and provide a radiant heat with convection heat flow within the cabinet.

Yet another objective is construction of an oven having better efficiency with reduced wattage per hour of use.

Still another objective of this invention is construction of a holding cabinet with heater elements positioned with consideration for either single or dual access doors, facilitating tear-down and serviceability of heaters, and resultant reduction in maintenance costs.

Further objects and advantages of the invention will become apparent from the following detailed description of the preferred embodiments and from the accompanying drawings.

SUMMARY OF THE INVENTION

As such, the oven of the invention includes a thermal input means formed of one or more heater elements, generally a Nichrome wire in a mica jacket, with capability to achieve temperatures up to 1,000° F. A mechanical attachment of heater element to cabinet is a clamp or holddown plate formed of a first material having a high thermal capacity, which may be copper, brass, a steel alloy or stainless steel. The clamp contacts a lower surface of the heater, while the clamp further communicates with the cabinet inner skin or inner casing, generally of stainless steel, to form a heat sink of the unit. A UL standard insulation, between inner and outer casings of the oven, provides thermal resistance and augments thermal retention.

The clamp presses the upper surface of the heater element against a second material having relatively high thermal conductivity, copper, silver or aluminum, to form a heat conductor for rapidly conducting heat from the Nichrome wire to the chamber inner walls. The conductor is formed of two opposed "L-shaped" pieces in upright position, each "L-shaped" piece having an upright leg portion and a contiguous foot portion. The "L-shaped" pieces are brought together and the feet portions thereof welded together to form a "U-shaped" section, the heat conductor.

A heater element, positioned under the juncture of the foot and the leg of each "L" draws heat up the sidewall of the sink, (leg of the "L"), but away from the central floor portion of the cabinet, since the foot portions of the "L-shaped" pieces are not one contiguous material although the foot portions are joined together in cabinet construction. This design results in creating a natural heat motion within the cabinet.

The heater and clamp or holddown plate, so combined, prevent the heater from bowing away from the conductor, while simultaneously having a mirror effect with reflection of heat to rapidly achieve and maintain a predetermined temperature and serve as a heat sink.

BRIEF DESCRIPTION OF THE DRAWINGS

Specific features of the invention will be better understood from the following detailed description when considered in connection with the accompanying drawings in which:

FIG. 1 is a diagram for Radiation Heat Flow;

FIG. 2 is a diagram for Convection Heat Flow;

FIG. 3 is an electrically equivalent circuit for the invention indicating input heat flow with diagram elements shown as;

Figure 5:
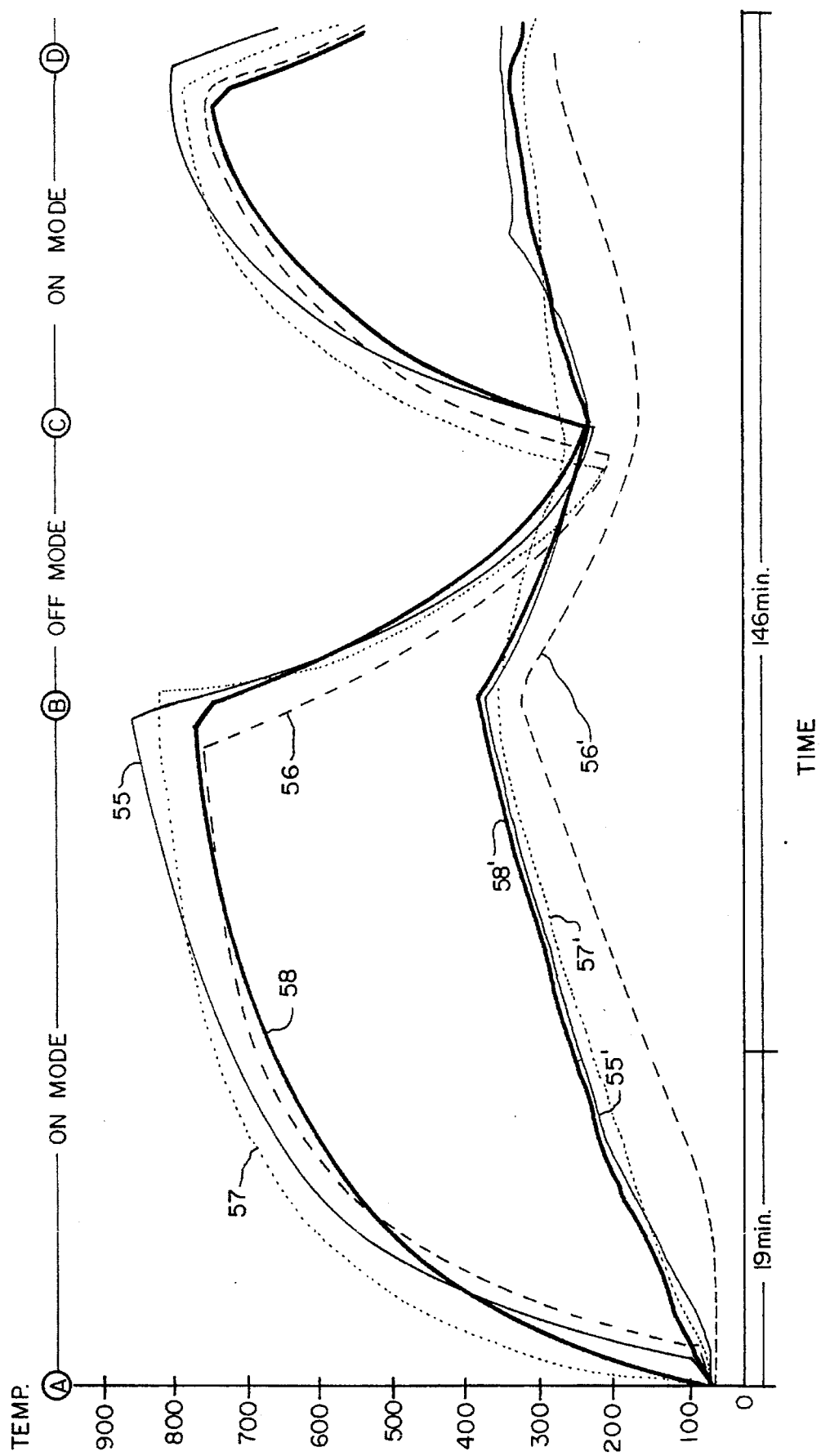

1. 117 Volt AC Source
2. Thermostat
3. Heater Sink
4. $M_1$—Heater Mounting Block
5. $R_1$—Thermal Resistance of Aluminum
6. $M_2$—Mass of the Aluminum Heat Conductor
7. $R_2$—Thermal Resistance of Stainless Steel
8. $M_3$—Mass of the Stainless Steel Inner Chamber
9. $R_3$—Thermal Resistance of the Insulation (R22)

FIG. 4 is an electrically equivalent circuit for the invention in the power off mode, showing no input heat flow, but with heat load added;

10. $M_4$—Mass of the Thermal Load
11. $R_4$—Thermal Resistance due to Convection FIG. 5 is a graph for Test Results for heater temperatures for holddown plates comprising respectively aluminum, 55, mild steel alloy, 56, copper, 57, and stainless steel, 58, taken from a first lead measuring heater element temperatures as a function of time; and, graph lines 55', 56', 57', and 58', for the respective materials, with temperatures taken from a second lead measuring concurrent temperatures within the oven chamber;

FIG. 6 is a perspective view of a prior art holding oven indicating heretofore prevalent positioning for heater elements in general;

FIG. 7 is a cut-away front plan for the oven of the present invention demonstrating heater elements with holddown plates forming the heat sink, the heat sink and natural air flow within the cabinet; and, FIG. 8 is a perspective view of the cabinet of the present invention showing the position of the heater element and the heat conductor wall.

DETAILED DESCRIPTION OF THE PREFERRED EMBODIMENT

There are three different flow laws for heat, corresponding to three different heat processes. Associated with heat conduction is the name of Fourier, with heat convection is the name Newton, and with heat radiation are the names Stefan-Boltzmann.

Heat Transfer by Radiation

Several designs used the principle of heat transfer by radiation. FIG. 1 shows a heated surface $\theta_1$ that is losing heat by radiation to a region of lower temperature $\theta_2$. The heat flow is given by the Stefan-Boltzmann law for surface radiation, which is:

$Q = \sigma A \epsilon (\theta_1^4 - \theta_2^4)$ joules/sec where

Q=heat flow, joules/sec $\sigma$=the Stefan-Boltzmann constant=$5.672 \times 10^{-8}$ joules/m²-sec-deg⁴

$\epsilon$=emissivity of the surface (between 0 and 1)

A=surface area, m²

$\theta$=temperature, deg K

In a practical application, designs using the principle of radiation heat transfer, have large internal thermal gradients because of the radiation resistance. The radiation resistance is written approximately $$R = \frac{d\theta}{dQ} = \frac{1}{4A\sigma\epsilon\theta_a^3} \text{ deg-sec/joule}$$

where $\theta_a$ is the average of radiator and receiver temperatures. The radiation resistance varies inversely as the cube of the average temperature. The resistance as calculated from the above equation is not seriously in error when the source and receiver temperatures differ by a factor of two, but the error increases rapidly for greater differences.

Heat Transfer by Convection

To consider those systems that use convection heat transfer, refer to FIG. 2 (which shows a fluid, either a liquid or gas, in either laminar or turbulent flow), $\theta_2$, which flows across a heated surface $\theta_1$, and thereby carries heat away from the heated surface. The region of the flowing liquid that absorbs or gives up the heat is the boundary layer. The convection heat transfer is given by Newton's law of "cooling," which is Q=h'A $(\theta_1 - \theta_2)$ joules/sec where h' is the convection coefficient (joules/m²-sec-deg K). For a given state, h' is nearly constant and is not dependent upon the state of the fluid flow, whether it is laminar or turbulent. It is important to realize that the process by which heat is carried from the heated surface to the fluid is molecular conduction, and for this reason the process of heat conduction by convection is essentially the same as that by conduction. One may, in fact, relate the Newton law to the Fourier law in the fluid at the surface of contact of the fluid and the wall.

The thermal resistance due to convection is $$R = \frac{d\theta}{dQ} = \frac{1}{h'A} \text{ deg-sec/joule}$$

Heat Transfer by Conduction

In considering a heat conducting system, where the ends of a conducting substance of which are maintained at different temperatures, $\theta_1$ and $\theta_2$, by application of the Fourier law $$Q = \frac{kA}{L} (\theta_1 - \theta_2) \text{ joules/sec}$$

where

Q=heat flow, joules/sec k=thermal conductivity, joules/meter-sec-deg

A=area normal to the heat flow, m²

L=length of conductor, m $\sigma$=temperature, deg K.

The thermal resistance for a conducting substance is $$R = \frac{d\theta}{dQ} = \frac{L}{kA} \text{ deg-sec/joule}$$

The Royalton system is one that involves the transfer of heat from one substance to another. This is characterized by a system that has both resistance and capacitance. Substances that are characterized by resistance to heat flow have negligible storage of heat, and substances that are characterized by heat storage have negligible resistance to heat flow. There are many substances that satisfy the validity of such approximations. For example, substances as air, wood, cork, etc. possess high thermal resistance, but low thermal capacitance, whereas a block of aluminum or copper has a high thermal capacitance with a relatively low thermal resistance.

Thermal Capacitance

The thermal capacitance can be determined using the following relation $$C \frac{d\theta}{dt} = Q \text{ joules/sec}$$

where

C=thermal capacitance, joules/deg t=time, sec

The thermal capacitance is written directly as $C=WC_p$ where

W=weight of substance, kg $C_p$=specific heat at constant pressure, joules/deg-kg.

The Royalton System

The Royalton system can best be described in two electrically equivalent diagrams. The first diagram, FIG. 3, shows the application of a thermostatically controlled electrical energy source that provides the heat energy to the system. The second diagram, FIG. 4, shows the energy source removed with the heat load (food) placed within the chamber.

The specific heat of aluminum is

20° C.=0.214 cal/gm

100° C.=0.225 cal/gm

200° C.=0.248 cal/gm

The specific heat of iron is

20° C.=0.107 cal/gm

100° C.=0.115 cal/gm

200° C.=0.127 cal/gm

The conductivity of aluminum is

18° C.=0.480

100° C.=0.492

200° C.=0.550

The conductivity of steel is

18° C.=0.108

100° C.=0.107

Turning now to FIG. 3, the heater means or element 3 is controlled by thermostat 2 from the 117 VAC energy source 1. The heater element transfers heat directly to the holddown plate 4, which plate is preferably stainless steel, such that the plate reflects heat back at the element with a mirror effect, whereby the sink for rapid increase of thermal energy. The heat sink of 3 and 4 further transfers heat to mass of aluminum or heat conductor, 6, via its thermal resistance 5. Because the aluminum is highly conductive and contains a relatively large mass, the temperature $T_2$ is just slightly lower than the heater assembly temperature $T_1$. The resistor 7 represents the thermal resistance of the stainless steel and is about 5 times greater in value. The value for capacitance 8 is about equal to that of the aluminum mass because the ratio of the specific heats is 2 to 1 and the weight of the steel cabinet is about twice that the aluminum heat conductor. The value of resistor 9 is that of the glass wool insulation (R22), and is a very large value of resistance.

Once the system is stabilized at its operating temperature, the thermal load 10, usually preheated trays of prepared food, is stored in the cabinet and the power removed. This is best shown by the equivalent thermal diagram of FIG. 4. All of the stored thermal energy in elements 6 and 8 is transferred to the food via the natural convection currents as determined by the value assigned to resistor 11. As the temperature $T_4$ of the load 10 tends to decrease, the stored energy is transferred maintaining the food at a relatively constant temperature for long periods of time.

A target temperature within the cabinet may be designated by a food service company, standards and rules of the school, hospital or other institution using the oven or by the specific type of food within the oven itself. Most health department have minimum temperature requirements ranging from 140° F. to 160° F. Thus the thermostat control preferably includes ON and OFF MODES to achieve a target temperature within the cabinet of about 200° F.

The chart of FIG. 5 graphs temperatures as a function of time to indicate test results on use of heater holddown plates of various materials. Temperatures were taken from a first lead on the heater element, (higher temperature or line set), and a second lead from within the cabinet, (lower line set shown with numbers primed), during both the automatic thermostatically controlled ON MODE, (time interval A—B, top of chart), OFF MODE, (B—C), ON MODE, (C—D).

EXAMPLE I

A heat sink was constructed using a heater element comprising a mica jacketed nichrome wire mechanically fastened to an enclosed heating cabinet by means of a holddom plate under a lower surface of the heater, that plate formed of aluminum having the same length and width dimensions as the heater to restrict the heater element from bowing away from the cabinet at maximum heater element temperatures. The upper surface of the heater element of the heat sink thus formed was placed against an L-shaped aluminum mass, at the juncture of the upright leg portion of L-shaped aluminum heat conductor and the foot portion of aluminum conductor. The cabinet was equipped with an automatic thermostat controller with an ON MODE and an OFF MODE, adapted to achieve a target temperature within the cabinet of 200°. A first temperature lead was clamped between the aluminum holddown plate and the heater for determining temperatures of the heater element over time; while a second temperature lead was positioned within the cabinet to record cabinet temperatures over a corresponding time. As such, the test run for use of a heater holddown plate of aluminum produced the solid thin temperature line 55, for the heater element temperature and line 55' for the corresponding cabinet temperatures. The maximum heater element temperature was 850° F. with a corresponding maximum cabinet temperature of 380° F.

EXAMPLE II

The second test was run on the same cabinet, with the same temperature lead placements, using the same heater element under the same conditions of EXAMPLE I above, but with a holddown plate comprising a mild steel alloy. As such, the test run for use of a heater holddown plate formed of mild steel alloy produced the dashed temperature line 56, for the heater element temperature and line 56' for the corresponding cabinet temperatures. The maximum heater element temperature was 60° F. with a corresponding maximum cabinet temperature of 325° F.

EXAMPLE III

The third test was run on the same cabinet, with the same temperature lead placements, using the same heater element under the same conditions of EXAMPLES I and II above, but with a holddown plate comprised of copper. As such, the test run for use of the copper holddown plate produced the dotted temperature line 57, for the heater element temperature and line 57' for the corresponding cabinet temperatures. The maximum heater element temperature during use of the copper holddown plate was 798° F. with a corresponding maximum cabinet temperature of 375° F.

EXAMPLE IV

The fourth test was run on the same cabinet, with the same temperature lead placements, using the same heater element under the same conditions of EXAMPLES I, II and III above, but with a holddown plate comprised of stainless steel. As such, the test run for use of the stainless steel holddown plate produced the heavy black temperature line 58, for the heater element temperature and line 58' for the corresponding cabinet temperatures. The maximum heater element temperature during use of the copper holddown plate was 775° F. with a corresponding maximum cabinet temperature of 390° F.

Thus, FIG. 5 graphically demonstrates that heater element holddown plates comprising stainless steel are preferable in constructing the heat bank for two reasons: 1) Because stainless steel has higher thermal capacitance and resistance, plates of stainless steel were found to discharge thermal energy more slowly in the power off mode; and, 2) The stainless steel plates produced higher cabinet temperatures with at lower heater element temperatures for reduced thermal trauma to the heater elements. Stated otherwise, holddown plates made of stainless steel produced the highest cabinet temperature, 390° F., shown by heavy black temperature line, 58', consequent to a relatively low, maximum heater element temperature of 775°, heavy black line, 58, than the plates of aluminum, 55', 55, mild steel alloy, 56',56, or copper, 57',57.

The test results shown in the chart of FIG. 5 further indicate that the equipment having both ON and OFF MODES serves as a heat sink in the off mode, thus maintaining a safe holding temperature much longer than conventional heating methods while the heater element is off. When in use, the heat conductor/sink also serves to stabilize the equipment temperatures as the door or doors are constantly being opened and closed.

FIG. 6 is a perspective view of a holding cabinet to indicate usual positioning generally prevalent for heater elements 30 in the prior art.

FIG. 7 is a front cut-away view of the Royalton cabinet 22 demonstrating the heater element 30 which is retained against aluminum conductor 60 by holddown plate 32. The upright wall of the aluminum mass forming heat conductor 60 gives a natural convection heat flow 38 within the holding oven of the present invention.

FIG. 7 further indicates that the Royalton Natural Air Movement System also incorporates the laws of physics that:

a) A heated gas rises and cooler gases descend;
b) Stainless steel is characterized by low conductivity and high capacitance and positioning the hold down plate immediately adjacent to the heating element results in a mirror effect creating a heat sink, wherein the steel plate reflects the heat back which is then drawn off by the aluminum conductor;
c) Aluminum is characterized by high conductivity and more rapid thermal transmission which pulls heat from the heater element and thereby serves as a heat sink.

Advantageous results are achieved by the heat repulsion or resistance of one material, the holddown plate preferably formed of stainless steel on one surface of the heater element, and the thermal conductivity of a second material, a mass of aluminum comprised of L-shaped pieces 61, 62 fastened together, are positioned adjacent the second surface of the heater element to draw heat away from the heater element and up the sidewalls of the cabinet. The unique use of the highly conductive and less conductive materials and relative positioning of the heater elements at the juncture of the leg and foot portions of each L-shaped aluminum piece, gives resultant natural heat circulation 38, better efficiency by use of less wattage per time unit, reduced temperature variation within the cabinet and enhanced serviceability with resulting lowered maintenance costs.

In FIG. 7, the oven of the invention 100 includes a thermal input means formed of one or more heater elements 30, generally a Nichrome wire in a mica jacket, with capability to achieve temperatures up to 1,000° F. Heater means or element 30 is mechanically affixed to cabinet 22 by holddown plate 32 formed of a first material having a high thermal capacity, which may be a ceramic material, copper, brass, mild steel alloy, aluminum, or stainless steel. But in accord with the test results shown in FIG. 5 above, the holddown plate 32 is preferably formed of stainless steel. The holddown plate 32 contacts a lower surface of the heater element 30, to form heat bank 33. The heater means or heater element 30 and the holddown plate 32, formed of stainless steel, a ceramic material, copper, brass, or a mild steel alloy, is also shown as heat bank 3,4 with resistance 7 for stainless steel, in FIG. 3. The holddown plate 32 further communicates with the cabinet inner skin or inner casing 24, generally of stainless steel, to form a heat bank, (3,4 in FIG. 3), of the unit.

Reference to FIG. 7 indicates a UL standard insulation 28, between inner 24 and outer 26 casings of the oven, provides thermal resistance (11 in FIG. 4) to augment thermal retention.

The clamp or holddown plate 32 further presses the heater element 30 against a second material having relatively high thermal conductivity, copper, silver or aluminum, (element 6 in FIG. 3), to form a heat conductor 60 for rapidly conducting heat from the Nichrome wire heater element 30 to the chamber inner walls 24.

FIG. 7 further shows that heat conductor 60 is formed of two opposed "L-shaped" pieces 61,62 in upright position. A heater element 30, positioned under the juncture of the foot and the leg of each "L" draws heat up the sidewall of the conductor 60', (leg of the "L"), but away from the central floor portion 23 of the cabinet, since the foot portions of the "L-shaped" pieces are not one contiguous material although the foot portions are joined together in cabinet construction. The fact that the lateral floor portions, (foot of each L), and sides, (leg of each L), of the cabinet are hottest to propel the thermal energy upward along the cabinet sides and downward along a central portion 23. This design results in creating a natural heat convection within the cabinet.

The heater and clamp, so combined, prevent the heater from bowing away from the sink, while simultaneously having a mirror effect with reflection of heat to rapidly achieve the predetermined temperature.

FIG. 8 is a perspective elevation of a heater cabinet of the subject invention showing the heater element 30 positioned against the aluminum mass at the juncture of the upright leg portion 60 of the L-shaped piece and the contiguous foot portion of the L-shaped piece which form the heat conductor of the present invention.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular suggestion or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A holding oven having a chamber, a heater means for the chamber and an energy source for the heater means, comprising:

a heat sink comprising a first material characterized by a high thermal capacity, the first material comprising stainless steel, and a heat conductor comprising a second material characterized by a high thermal conductivity, the second material comprising aluminum, the heater means contacting the first material and further in contact with the second material; further comprising a heater mounting clamp associated with the oven; wherein the clamp comprises a mounting plate with brackets dimensioned to receive the heater means, adapted to secure the heater means against the heat conductor and prevent the heater means from bowing away from the conductor; wherein the heater means and the associated mounting plate with brackets form a heat conductor; the heat sink is controlled by a thermostat supplied by an energy source; the heater means is a Nichrome wire; wherein the first and second materials have a specific heat, and the specific heat of the second material is in a range from 1.95 to 2 times specific heat of the first material at temperatures from 20° C. to 200° C.; wherein said first and second materials have a conductivity, and the conductivity of the second material is in a range from 4.4 to 4.6 times conductivity of the first material at temperatures from 18° C. to 200° C.; wherein said first and second materials have a mass and thermal capacitance, and the mass of the first material is more than 2 times the mass of the second material, and wherein the thermal capacitance of the first material is more than two times the thermal capacitance of the second material; further comprising a means for creating a natural convection current within the cabinet; wherein said means for creating a natural convection current comprises the aluminum conductor, constructed of opposed L-shaped pieces, each of the L-shaped pieces having an upright leg and a contiguous foot portion, with the heater means affixed to the cabinet under the juncture of the foot and the leg of each L piece, and the leg of each L-shaped piece draws heat up the sidewall of the conductor and away from the central floor portion of the cabinet, to create a convection heat flow within the cabinet.

2. A holding oven according to claim 1, wherein the foot portions of the L-shaped pieces are welded together to form a U-shaped heat conductor section.

3. A holding oven according to claim 2, wherein the oven has a generally rectangular shape and further comprises outer oven walls, an inner skin forming the chamber, and at least one door for access to the chamber.

4. A holding oven according to claim 3, wherein the chamber inner skin is separated from the oven walls by an insulation.

5. A holding oven according to claim 4, wherein the insulation is fiberglass insulation.

6. A holding oven according to claim 5, wherein the said insulation has an insulating value in a range between R10 to R70.

7. A holding oven according to claim 6, wherein the cabinet casing has a height dimension, and the upright leg of each of the opposed L-shaped pieces extends a distance ranging between from 55% to 95% of the height of the cabinet casing.

8. An oven for comestible foods having an inner casing and an outer casing, a compartment formed by the inner casing, and a heater element having a power source, the holding oven comprising:

a stainless steel mounting plate with support brackets for attachment of the heater element to the oven to form a heat sink;

a thermostat associated with the heat sink for temperature control in the cabinet;

an aluminum heat conductor adjacent to the inner casing and contacting the heat sink to draw heat from the sink for discharge into the compartment formed by the inner casing.

9. The oven of claim 8, wherein the heat sink is formed of a material characterized by a high thermal capacitance; and the heat conductor is constructed of a material characterized by a high thermal conductivity.

10. The holding oven of claim 9, further comprising a means for creating a natural convection current within the cabinet.

11. A holding oven for comestible foods having a chamber, a heater means for the chamber and an energy source for the heater means, comprising:

a heat sink comprising a first material characterized by a high thermal capacity, the first material comprising stainless steel, and a heat conductor comprising a second material characterized by a high thermal conductivity, the second material comprising aluminum, the heater means clamped between the first material and the second material, for rapidly attaining a target temperature by contact between the heater element and the stainless steel, and swift conduction of heat by the aluminum material to the chamber.

* * * * *